May 18, 1954
E. J. LABER
2,678,851
QUICK RELEASE APPARATUS FOR FLUID PRESSURE BRAKES
Filed April 27, 1951
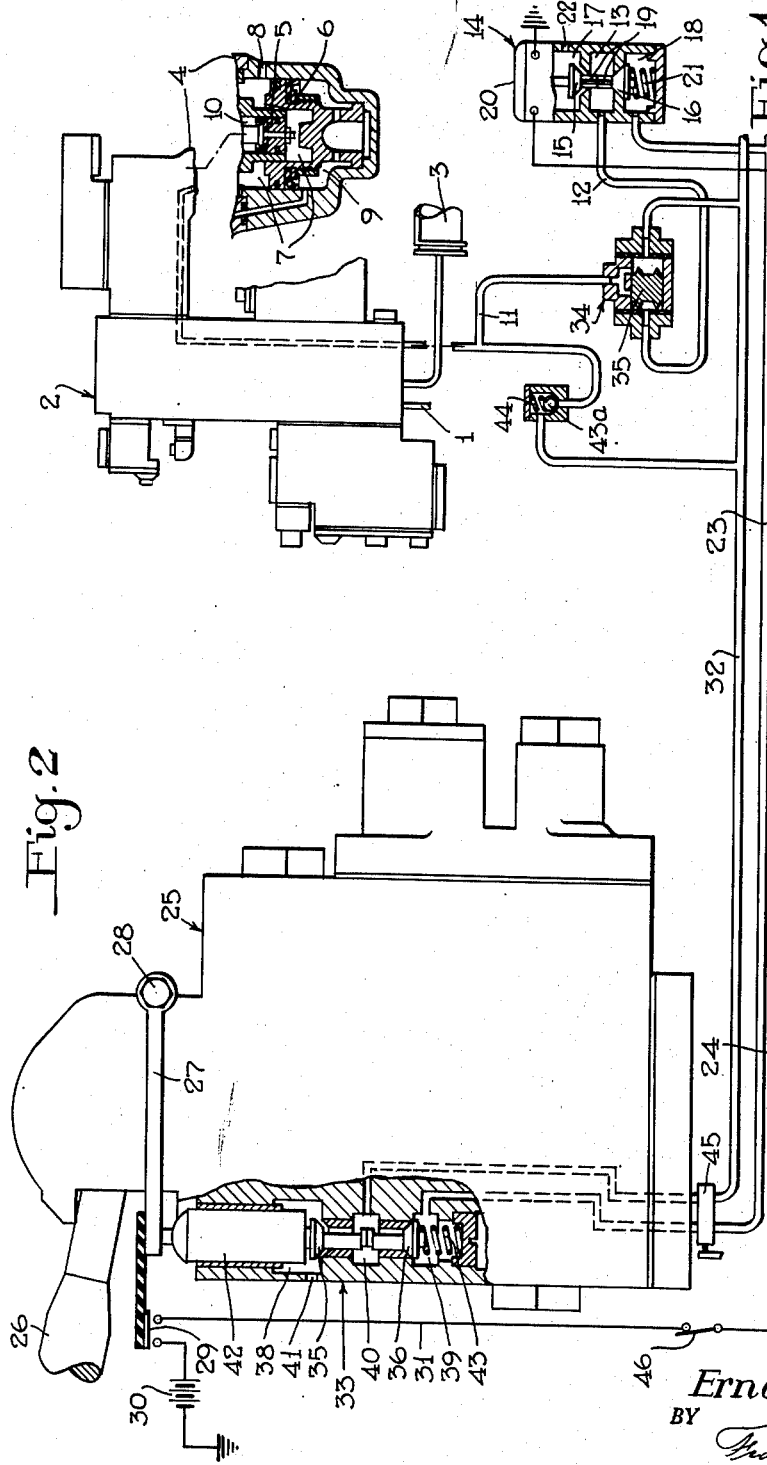
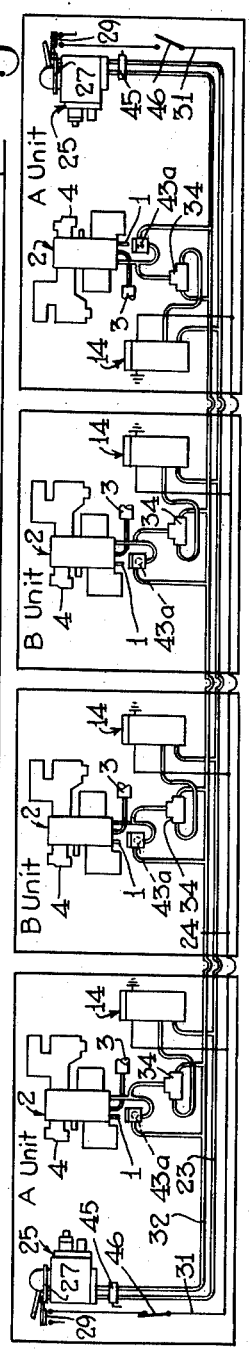
INVENTOR.
Ernest J. Laber
BY
Frank E. Miller
ATTORNEY Patented May 18, 1954

2,678,851

UNITED STATES PATENT OFFICE 2,678,851

QUICK RELEASE APPARATUS FOR FLUID PRESSURE BRAKES

Ernest J. Laber, Irwin, Pa., assignor to Westinghouse Air Brake Company, a corporation of Pennsylvania Application April 27, 1951, Serial No. 223,221

3 Claims. (Cl. 303—14)

This invention relates to fluid pressure brakes and more particularly to the type for use on railway locomotives.

The No. 24RL locomotive brake equipment shown and described in Westinghouse Air Brake Company's Instruction Pamphlet No. 5066 dated March 1948 is employed on modern diesel locomotives comprising a multiple of connected units usually including like leading and trailing A units and one or more like intermediate B units. On each of these units there is provided a brake controlling valve device adapted to respond to a reduction in pressure of fluid in a brake pipe, extending through the several units of the locomotive for connection with the brake pipe on cars of a train, to apply the fluid pressure brakes on the respective unit when the fluid pressure brakes on the connected cars of the train are applied in response to such reduction. An independent release valve device is associated with each of the brake controlling valve devices for operation by fluid under pressure to release the brakes on the unit independent of control from the brake pipe and hence without necessitating release of brakes on the cars of the train. An actuating pipe extends through the several units of the locomotive and to this pipe are connected the independent release valve devices on said units, and an engineer's independent brake valve device on each of the two A or end units of the locomotive is connected to said pipe through a cut-out valve which on the trailing A unit is closed. On the leading A unit the independent brake valve device is operative to a release position to supply fluid under pressure to the actuating pipe and thence to the several independent release valve devices to operate said release valve devices to release the fluid pressure brakes on the units, as above mentioned.

A multiple unit diesel locomotive and the actuating pipe thereon are relatively long and due to resistance to flow of fluid under pressure through said pipe, the pressure of fluid supplied to said pipe by the independent brake valve device on the leading A unit will increase much more rapidly on the leading unit than on the trailing unit. As a result, the independent release valve device on the leading A unit will operate in response to pressure of fluid supplied to the actuating pipe to initiate a release of the fluid pressure brakes on said leading unit sooner than the independent release valve devices on the other units will respond to pressure in said pipe to initiate a release of the fluid pressure brakes thereon. This is satisfactory if the handle of the independent brake valve device is held in its release position for the necessary and relatively short period of time required to effect a release of brakes on the trailing A unit at which time a release of brakes on all other units of the locomotive will have occurred. However, if the independent brake valve device is held in release position only long enough to effect a desired release of the fluid pressure brakes on the leading A unit, and which release will be indicated by a gauge in the locomotive cab connected to the brake cylinder device on said unit, and is then moved out of release position for venting the actuating pipe, all of the independent release valve devices throughout the locomotive will move out of their brake release position at a time when the brakes on the units to the rear of the leading A unit may be only partially released, since, as above described, the brakes on the units to the rear of the leading A unit will not start to release as soon as the brakes on the leading A unit start to release. In fact, if the independent brake valve device on the leading A unit is operated to and then out of release position for releasing the locomotive brakes in steps, observed by the pressure gauge connected to the brake cylinder device on said unit, it is possible to effect a full release of brakes on the leading A unit without any release of brakes on the trailing A unit. It is undesirable to have brakes applied on any locomotive unit when it is intended that they be released since excessive wear, heating and possible loosening of tires on the locomotive wheels may result.

The principal object of the invention is therefore the provision of improved means for insuring release of brakes on all units of a locomotive in response to operation of the independent brake valve device.

Other objects and advantages will become apparent from the following more detailed description of the invention.

In the accompanying drawing: Fig. 1 is a diagrammatic view of a multiple unit locomotive with brake apparatus pertinent to the invention shown in outline on each unit; and Fig. 2 is a diagrammatic view, partly in section and partly in outline, of the brake apparatus employed on different units of the locomotive.

Description

The fluid pressure brake equipment embodying the invention and for use on multiple unit locomotives, such as the diesel type, comprising two end A units either one of which may be at the leading end of the locomotive, and one or more intermediate B units connected together and two said end units, and which units are indicated in Fig. 1 of the drawing by suitable legends, generally may be like that disclosed in Patent 2,173,940, issued to E. E. Hewitt et al. on September 26, 1939, modified as in Patent 2,464,977 issued to A. T. Gorman on March 22, 1949. Still further, the brake equipment, less the invention, is fully disclosed in the Instruction Pamphlet above referred to. In view of these patents and Instruction Pamphlet only such parts of the locomotive brake equipment are shown in the drawing as deemed necessary for a clear understanding of the invention. For like reasons the following description thereof will also be limited.

As shown in the drawing, the reference numeral 1 designates the usual brake pipe which, while not shown in the drawing, is adapted to extend through the several units of the locomotive and be connected to cars of a train and through the medium of which the brakes on the locomotive and cars of the train are adapted to be controlled on the usual automatic principle. The numeral 2 designates a brake controlling valve device, one of which is employed on each unit of the locomotive, adapted to respond to a reduction in pressure of fluid in brake pipe 1 to effect a supply of fluid under pressure to a brake cylinder device 3 to apply the brakes on the respective unit and adapted to respond to restoration of pressure of fluid in said brake pipe to effect release of fluid under pressure from said brake cylinder device to release the brakes on the locomotive unit, in the usual manner.

Associated with each brake controlling valve device 2 is an independent release valve device 4 comprising two coaxially arranged pistons 5, 6 between which there is a chamber 7 vented to atmosphere via port 8. At the opposite side of piston 6 is a control chamber 9, while the opposite side of piston 5, which is of smaller diameter than piston 6, is constantly subject to pressure of fluid in a valve chamber 10 with chamber 9 vented, pressure of fluid in chamber 10 is adapted to move piston 5 to a normal position in which it is shown in the drawing and in which position it provides for control of pressure in the brake cylinder device 3 by operation of the brake controlling valve device 2 in response to reduction and increase in pressure in brake pipe 1. When chamber 9 is charged with fluid under pressure such pressure acting on piston 6 is adapted to actuate said piston to move piston 5 to an upper or brake release position for releasing an application of brakes on the locomotive unit independent of pressure of fluid in the brake pipe and hence without necessitating release of brakes on cars of a train.

According to the invention, the piston chamber 9 is connected via pipes 11 and 12 to a chamber 13 in a magnet valve device 14. The magnet valve device 14 comprises two oppositely seating poppet valves 15, 16 contained in chambers 17, 18 and having fluted stems 19 engaging each other in chamber 13, and a magnet 20 operative upon energization to seat valve 15 and unseat valve 16 for thereby closing chamber 13 off from chamber 17 and opening it to chamber 18. Upon deenergization of magnet 20 a spring 21 is adapted to seat valve 16 and unseat valve 15 for thereby closing chamber 13 off from chamber 18 and opening it to chamber 17. Chamber 17 is constantly open to atmosphere through a vent 22 while chamber 18 is open to a main reservoir pipe 23 adapted to extend through the several units of the locomotive and to be constantly supplied with fluid under pressure.

It will be seen that upon energization of magnet 20 on each locomotive unit fluid under pressure will be supplied to piston chamber 9 to operate the respective independent release valve device 4 to its release position to release an application of brakes on the unit while upon deenergization of said magnet said chamber will be vented to permit application of brakes on said unit by operation of the brake controlling valve device 2.

Numeral 24 designates an independent release wire extending through the several units of the locomotive and to which the magnets 14 on said units are connected in parallel. Numerals 25 designate the usual engineer's independent brake valve devices, one on each of the A units, of the 24RL locomotive brake equipment. Each brake valve device 25 comprises a handle 26 having a normal elevated position, in which it is shown in the drawing and in which it is carried during automatic control of the brakes on the locomotive and cars of a train through the brake pipe 1. The handle 26 is also depressible to an independent brake release position for engaging and turning a bail 27 about a fulcrum pin 28. According to the invention, an electric contact 29 is associated with the bail 27 for electrically connecting a suitable source of electric energy, such as one terminal of a storage battery 30, to a wire 31 connected to the wire 24. As shown in the drawing, the other terminal of battery 30 may be grounded as well as the terminals of all magnets 20 not connected to wire 24.

It will now be seen that if an automatic application of brakes is in effect on the locomotive due to operation of the brake controlling valve device 2 in response to a reduction in pressure in brake pipe 1, and the engineer on the locomotive desires to release the brakes on the locomotive independently of the brake pipe, he need only depress the independent brake valve handle 26 to connect battery 30 to wire 24. The magnets 20 on all locomotive units will thereby become energized simultaneously to supply fluid under pressure from the main reservoir pipe 23 to piston chamber 9 of the respective independent release valve device 4 to cause operation thereof to simultaneously effect a release of the brake application on all of the locomotive units, as desired.

The numeral 32 designates an actuating pipe and numeral 33 designates an independent brake release valve portion of the brake valve device 25, both said pipe and valve portion constituting parts of the 24RL locomotive brake equipment heretofore employed for effecting, in response to depression of the brake valve handle 26, release of a brake application on a locomotive independently of the brake pipe 1. By the use of the magnets 20, wire 24 and brake valve controlled switch 29 the actuating pipe 32 and release valve portion 33 might be dispensed with, but I prefer to retain them for use in case of failure of the source of electric current 30, breakage of wire 24, or the like, to provide for independent release of an automatic application of locomotive brakes in case such is desired.

The actuating pipe 32 extends through the locomotive and, due to its retention, on each locomotive unit, I provide a double check valve device 34 comprising a double check valve 35 the opposite ends of which are subject, respectively, to pressure in said pipe and pipe 12 and which is arranged to control communication between said pipes and pipe 11 connected to one side of said valve. When the magnets 20 are energized to supply fluid under pressure to pipe 12 such pressure on each unit will shift the double check valve 35 to the position opposite that in which it is shown in the drawing for opening pipe 12 to pipe 11 whereby supply and release of fluid under pressure to and from the respective independent release piston chamber 9 may be controlled by said magnet as above described.

The independent brake release valve portion 33 of each brake valve device 25 comprises two oppositely seating poppet valves 36, 37 contained respectively in chambers 38, 39 and having fluted stems engaging each other in an intermediate chamber 40. Chamber 38 is open to atmosphere through a vent 41. Chamber 39 is open to the main reservoir pipe 23 and thus adapted to be constantly supplied with fluid under pressure, while chamber 40 is open to the actuating pipe 32. A plunger 42 slidably mounted in the brake valve casing with one end disposed under the bail 27 for engagement therewith has its opposite end disposed in chamber 38 in contact with valve 35 whereby upon depression of handle 26 to actuate the switch contact 29 to connect battery 30 to wire 31, the plunger 42 will be operated to seat valve 35 and unseat valve 36. Upon removal of manual pressure on handle 26 a spring 43 in chamber 39 will seat valve 36, unseat valve 35 and operate plunger 42 to raise the bail and switch contact 29 to its circuit opening position.

The valve 35 controls communication between chambers 40 and 38 and valve 36 controls communication between chambers 40 and 39.

I also provide a communication from pipe 11 to the actuating pipe 32 controlled by a check valve 43 arranged to permit flow of fluid under pressure only in the direction from the former pipe to the latter pipe, and a spring 44 acts on said check valve to prevent such flow until after pressure in pipe 11 is increased to a degree required to move the respective independent release pistons 5, 6 to the upper, brake release position.

When the handle 26 is depressed to cause energization of magnets 20 to effect an independent release of brakes on the locomotive units, it will be noted that the downward movement of bail will also seat valve 35 and open valve 36 whereupon the actuating pipe throughout the locomotive will be charged with fluid under pressure and the right-hand end of the double check valves 35 will be subjected to pressure from said pipe. If the magnets 20 operate as intended the supply of fluid under pressure therefrom to the left-hand end of the double check valves 35 will increase the pressure thereon more rapidly than it is increased on the opposite end, as a result of which, the double check valves will move to their right-hand end position to permit control of the independent release valve devices 4 from the magnets 20 as above described. However, if the magnets 20 on any unit of the locomotive should for any reason fail to become energized upon depression of the brake valve handle 26, the provision of the actuating pipe 32 provides via the double check valve 35 for supply of fluid under pressure to the independent release valve piston chamber 9 on that unit to release the brakes thereon. Particularly if a magnet 20 fails on a unit to the rear of the lead unit A, such as the trailing A unit, it will be seen that the initiation of release of brakes will be somewhat delayed with respect to other units of the locomotive due to the time required to charge the actuating pipe with fluid under pressure but according to the invention such delay is minimized by the provision of the communication controlled by the check valve 43, since on every unit where the magnet 20 is energized, to supply fluid under pressure to pipe 11, just as soon as the pressure in said pipe increases to the degree necessary to move the respective independent release valve pistons 5, 6 to their release position, the check valve 43 will open to supply fluid under pressure to the actuating pipe 32. This supply of fluid under pressure to the actuating pipe 32 at spaced intervals thereon on the different units of the locomotive where the magnets 20 are energized is in addition to that provided at the head of the locomotive by the independent release valve portion 33 of the brake valve device so that the delay above mentioned will not be material and release of brakes on the unit on which the magnet failed will occur, for all practical purposes, at substantially the same time as on the other units.

Moreover, if the leading A unit of a locomotive is not provided with a magnet 20 and means for controlling same, retention of the actuating pipe 32 provides for usual control of the independent release valve devices 4 on said units and other units of the locomotive.

A cut-out cock 45 is provided under each independent brake valve device. On the leading locomotive A unit this cock opens communication between the brake valve device and pipes 23, 32 while on the trailing locomotive unit said cock will be closed to close such communications. A switch 46 is provided in wire 31 at each brake valve device to be closed on the leading A unit and opened on the trailing A unit. This switch may, if desired, be arranged for operation with the respective cut-out cock 45 to render the brake valve device on the leading A unit effective to control the brakes on the locomotive and the brake valve device on the trailing A unit ineffective.

*Summary*

It will now be seen that I have provided improved means for ensuring independent release of brakes on all units of a multiple unit locomotive in response to operation of the independent brake valve device on the leading unit. Where all units are equipped with the invention, the release of brakes on all units will be at the same time, and even in case the magnet 20 fails on one unit, the release of brakes on that unit will be accelerated by operation of the magnet 20 on other units to provide a substantially uniform release of brakes on the one unit with the release on the other units.

Having now described my invention, what I claim as new and desire to secure by Letters Patent, is:

1. In a fluid pressure brake equipment for a multiple unit locomotive, in combination, a brake pipe, a brake controlling valve device on each unit operative in response to a reduction in pressure in said brake pipe to effect an application of brakes on the unit and in response to an increase in pressure in said brake pipe to effect a release of brakes, an independent release device on each locomotive unit responsive to pressure of fluid in a chamber to release an application of brakes thereon effected by operation of the respective brake controlling valve device and operative upon release of fluid under pressure from said chamber to provide for application and release of brakes on the unit by said operation of said brake controlling valve device, an actuating pipe extending through the locomotive, a second pipe, a magnet device operative upon energization and deenergization of the magnet to supply and release fluid under pressure to and from said second pipe, means for selectively opening said chamber to either said actuating pipe or to said second pipe whichever is charged with fluid at the higher pressure, a wire extending through the locomotive, means connecting the magnets on the several units in parallel to said wire, and an engineer's control device on the leading one of the units operative to either supply fluid under pressure to or vent said actuating pipe and at the same time energize or deenergize, respectively, said wire.

2. In a fluid pressure brake equipment for a multiple unit locomotive, in combination, a brake pipe, a brake controlling valve device on each unit operative in response to a reduction in pressure in said brake pipe to effect an application of brakes on the unit and in response to an increase in pressure in said brake pipe to effect a release of brakes, an independent release device on each locomotive unit responsive to pressure of fluid in a chamber to release an application of brakes thereon effected by operation of the respective brake controlling valve device and operative upon release of fluid under pressure from said chamber to provide for application and release of brakes on the unit by said operation of said brake controlling valve device, an actuating pipe extending through the locomotive, a second pipe, a magnet device operative upon energization and deenergization of the magnet to supply and release fluid under pressure to and from said second pipe, means for selectively opening said chamber to either said actuating pipe or to said second pipe whichever is charged with fluid at the higher pressure, a one-way flow communication on each unit providing for flow of fluid under pressure from the respective chamber to said actuating pipe, a wire extending through the locomotive, means connecting the magnets on the several units in parallel to said wire, and an engineer's control device on the leading one of the units operative to either supply fluid under pressure to or vent said actuating pipe and at the same time energize or deenergize, respectively, said wire.

3. In a fluid pressure brake equipment for a multiple unit locomotive, in combination, a brake pipe, a brake controlling valve device on each unit operative in response to a reduction in pressure in said brake pipe to effect an application of brakes on the unit and in response to an increase in pressure in said brake pipe to effect a release of brakes, an independent release device on each locomotive unit responsive to pressure of fluid in a chamber to release an application of brakes thereon effected by operation of the respective brake controlling valve device and operative upon release of fluid under pressure from said chamber to provide for application and release of brakes on the unit by said operation of said brake controlling valve device, an actuating pipe extending through the locomotive, a second pipe, a magnet device operative upon energization and deenergization of the magnet to supply and release fluid under pressure to and from said second pipe, means for selectively opening said chamber to either said actuating pipe or to said second pipe whichever is charged with fluid at the higher pressure, a communication on each unit connecting the respective chamber to said actuating pipe, means for preventing flow of fluid under pressure through said communication in the direction from said actuating pipe to said chamber and responsive to a chosen excess of pressure of fluid in said chamber over that in said actuating pipe to permit flow of fluid under pressure through said communication in the opposite direction, a wire extending through the locomotive, means connecting the magnets on the several units in parallel to said wire, and an engineer's control device on the leading one of the units operative to either supply fluid under pressure to or vent said actuating pipe and at the same time energize or deenergize, respectively, said wire.

References Cited in the file of this patent

UNITED STATES PATENTS

| Number | Name | Date |
|---|---|---|
| 937,393 | Turner | Oct. 19, 1909 |
| 1,078,017 | Turner | Nov. 11, 1913 |
| 1,390,592 | Thomas | Sept. 13, 1921 |
| 1,879,646 | Thomas | Sept. 27, 1932 |
| 1,976,846 | Good | Oct. 16, 1934 |